(12) United States Patent
Washizuka et al.

(10) Patent No.: US 7,136,836 B1
(45) Date of Patent: Nov. 14, 2006

(54) ACCOUNTING AND RECONCILIATION SYSTEM

(75) Inventors: Satoshi Washizuka, San Jose, CA (US); Katsuya Nakagawa, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 547 days.

(21) Appl. No.: 09/675,252

(22) Filed: Sep. 29, 2000

(51) Int. Cl.
*G06Q 40/00* (2006.01)

(52) U.S. Cl. ............................ 705/39; 705/35; 705/38; 705/44

(58) Field of Classification Search ................ 705/30, 705/37, 35, 38, 44
See application file for complete search history.

(56) References Cited

U.S. PATENT DOCUMENTS

| | | | |
|---|---|---|---|
| 5,794,207 A * | 8/1998 | Walker et al. ................. 705/1 |
| 6,029,150 A * | 2/2000 | Kravitz ......................... 705/39 |
| 6,085,168 A * | 7/2000 | Mori et al. .................... 705/17 |
| 6,260,024 B1 * | 7/2001 | Shkedy ......................... 705/37 |
| 6,553,346 B1 * | 4/2003 | Walker et al. ................. 705/1 |
| 2002/0010685 A1 * | 1/2002 | Ashby .......................... 705/80 |

FOREIGN PATENT DOCUMENTS

| | | |
|---|---|---|
| JP | 09-282367 | 10/1997 |
| JP | 10-198739 A | 7/1998 |
| JP | 11-184947 | 7/1999 |
| JP | 2000-69571 A | 3/2000 |
| JP | 2000-207466 | 7/2000 |
| WO | WO99/09502 | 2/1999 |

OTHER PUBLICATIONS

Anonymous. "Buyers put faith in escrow", Automatic I.D. News. Cleveland: Nov. 1999.vol. 15, Iss. 12 w.*
Office Action in JP 2001-004252, Nov. 1, 2005.

* cited by examiner

*Primary Examiner*—Jagdish N Patel
(74) *Attorney, Agent, or Firm*—Nixon & Vanderhye, PC

(57) ABSTRACT

An accounting and reconciliation system includes a seller terminal that receives credit data guaranteeing payment, and payment data. A buyer terminal for a buyer sends purchase request data containing transaction information which specifies purchase transaction conditions. A reconciliation unit mediates a purchase transaction between the buyer and the seller in response to receiving the purchase request data communicated from the buyer terminal to the reconciliation unit. The reconciliation unit includes communication circuitry for communicating with the buyer terminal and the seller terminal and a processing system responsive to the purchase request data for sending the credit data to the seller terminal, and for sending the payment data to the seller terminal after receiving acknowledgment data indicative of the buyer's acknowledgment of receipt.

15 Claims, 13 Drawing Sheets

F I G. 1 5
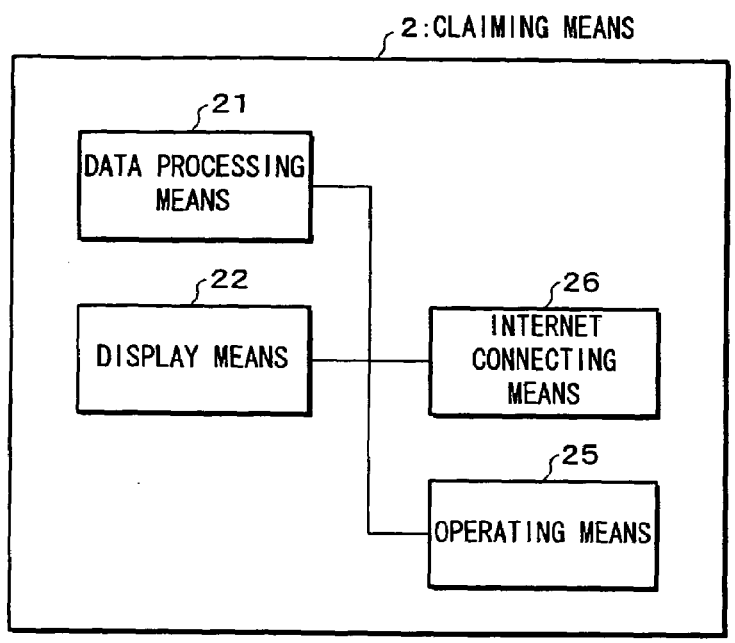
F I G. 1 6
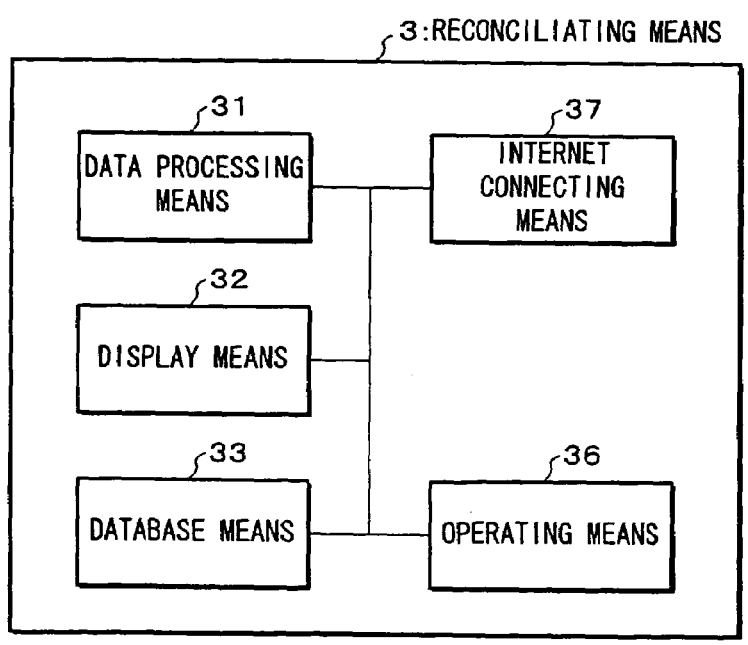

ACCOUNTING AND RECONCILIATION SYSTEM

FIELD OF THE INVENTION

The present invention relates to an accounting and account reconciliating system which can execute accounting and account reconciliation through communications using, for example, cellular phones, and the invention particularly relates to an accounting and account reconciliating system which allows accounting and account reconciliation of products purchased by a buyer without a credit card.

BACKGROUND OF THE INVENTION

Conventional portable electronic account reconciliating systems include, for example, the Internet connection service for cellular phones, or also known as "i-mode", offered by NTT DoCoMo Inc., where, for example, reservation and selling of air tickets are conducted. Further, Japanese Unexamined Patent Publication No. 198739/1998 (Tokukaihei 10-198739) (published date: Jul. 31, 1998) and No. 2000-69571 (published date: Mar. 3, 2000) disclose an electronic account reconciliating system using cellular phones. More specifically, the publication 10-198739 discloses a personal electronic account reconciliating system using portable paying means equipped with a plurality of communication means. Also, the publication 2000-69571 discloses an electronic account reconciliating system which includes a step whereby a buyer is identified to be a member of a wireless network.

As above, NTT DoCoMo Inc. offers ticket-less sales of air tickets on the cellular-phone-based "i-mode" service. However, in this system, reconciliation of accounts is made in the end by a credit card authority and it requires the user to possess a credit card. Further, because reconciliation is made by a credit card, payment to the airline companies as the claiming party is made on a monthly basis, which creates the problem that the system is not spontaneous and the interest before the actual payment must be born to either the user, credit company, or other claiming party. Further, when reconciliation is made abroad, due to the time delay from the date products and services were offered to the time of actual payment, there is a loss or margin on a balance sheet depending on the exchange rate.

The electronic account reconciliating system disclosed in the publication 10-198739 has the same problem since it also employs an account reconciliating function by a credit card as the final reconciliating means. Further, the publication 2000-69571 does not disclose anything about a specific transaction scheme on the electronic account reconciliating system.

SUMMARY OF THE INVENTION

It is an object of the present invention to provide an accounting and account reconciliating system which, for the buyers' advantage, allows accounting and account reconciliation without a credit card, and for the suppliers' advantage, allows instant redemption of the counter value for the supplied products or services.

In order to achieve the foregoing object, an accounting and account reconciliating system in accordance with the present invention includes: paying means including first communicating means for establishing communications, the paying means for applying for accounting in transactions between a buyer and a supplier; reconciliating means including second communicating means for establishing communications, the reconciliating means for arbitrating account reconciliation in the transactions; and claiming means including third communicating means for establishing communications, the claiming means for claiming a counter value in the transactions, the accounting and account reconciliating system for carrying out accounting and account reconciliation by communications between the paying means, the claiming means, and the reconciliating means, wherein: the paying means includes first data processing means which creates accounting application data for applying for accounting and account reconciliation for products or services ordered by the buyer to the supplier, and which sends the accounting application data to the reconciliating means via the first communicating means, and when the products or services are supplied to the buyer from the supplier, the first data processing means creates acknowledgement data which indicates supplied content and sends the acknowledgement data to the claiming means via the first communicating means, and the reconciliating means includes second data processing means which receives the accounting application data via the second communicating means, creates credit data based on the accounting application data received, and sends the credit data created to the claiming means via the second communicating means, the credit data for guarantee of account reconciliation of the products or services by the reconciliating means and containing information which specifies transaction conditions of the products or services, and the claiming means includes third data processing means which receives via the third communicating means the credit data sent from the reconciliating means and the acknowledgement data sent from the paying means, and judges whether the supplied content of the products or services satisfies the transaction conditions contained in the credit data based on the credit data and the acknowledgement data received, and when judges satisfy, sends the acknowledgement data received to the reconciliating means via the third communicating means, and the second data processing means of the reconciliating means, when received the acknowledgement data from the claiming means via the second communicating means, purchases the acknowledgement data upon confirmation of content of the acknowledgement data, and bills the buyer for the payment of the counter value for the supplied products or services so as to redeem money.

With this arrangement, the first data processing means creates accounting application data, and the accounting application data thus created is sent to the reconciliating means via the first communicating means. The reconciliating means creates credit data based on the accounting application data, and the credit data thus created is sent to the claiming means via the second communicating means.

On the other hand, when the buyer receives products or services from the supplier, the first data processing means of the paying means creates acknowledgement data, and the acknowledgement data thus created is sent to the claiming means via the first communicating means.

The third data processing means of the claiming means judges whether supply of the products or services has satisfied the transaction conditions, based on the content of the credit data received and the content of the acknowledgement data received. When the transaction satisfied the transaction conditions, the acknowledgement data is sent to the reconciliating means via the third communicating means.

The second data processing means of the reconciliating means, upon confirmation of the content of the acknowledgement data, purchases the acknowledgement data and bills the buyer for the payment of the counter value in the transaction so as to redeem the money.

In this manner, the reconciliating means creates credit data which guarantees account reconciliation by the reconciliating means, and transactions and account reconciliation of products or services are carried out based on the credit data, thereby making it possible to carry out transactions and account reconciliation without a credit card which guarantees the identity and credit of the buyer. Accordingly, the buyer is not required to have a credit card. Further, from the suppliers' stand point, since account reconciliation of transactions is guaranteed by the reconciliating means even when products or services were ordered from a buyer whose identity and credit history are unknown, the supplier can supply the products or services to the buyer with confidence.

Further, by the system where the reconciliating means purchases the acknowledgement data, the supplier can obtain the counter value for the products or services instantly from the reconciliating means, thus greatly reducing the time lag between supply of products or services and redemption of the counter value. As a result, there is no problem as to who will bear the interest which derives from the time lag as in account reconciliation by a credit card, or the problem of a loss or merit on a balance sheet which arises from a change in exchange rate.

For a fuller understanding of the nature and advantages of the invention, reference should be made to the ensuing detailed description taken in conjunction with the accompanying drawings.

BRIEF DESCRIPTION OF THE DRAWINGS

FIG. 15 is a block diagram showing a schematic structure of claiming means in the accounting and account reconciliating system.

FIG. 16 is a block diagram showing a schematic structure of reconciliating means of the accounting and account reconciliating system.

DESCRIPTION OF THE EMBODIMENTS

First Embodiment

The following describes one embodiment of the present invention referring to the attached drawings.

Figure 1:
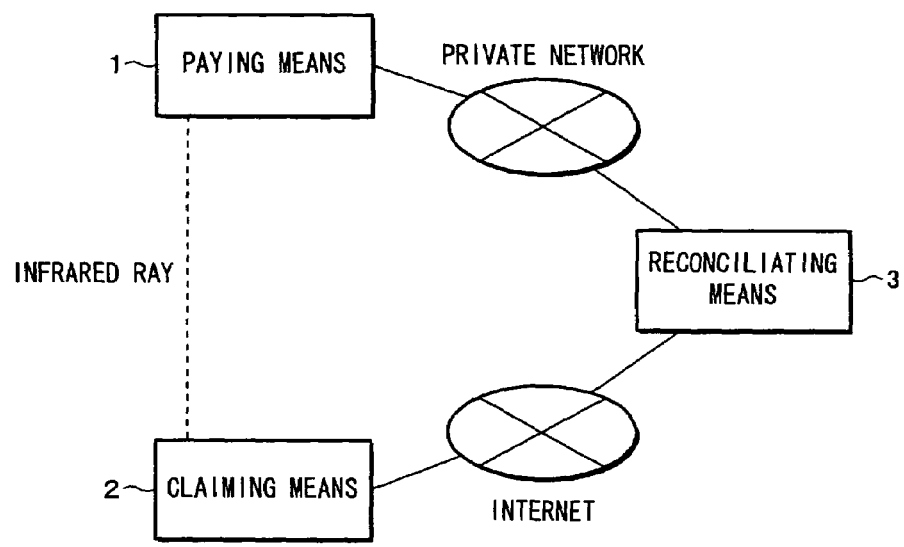
FIG. 1 is an explanatory drawing showing a schematic structure of an accounting and account reconciliating system in accordance with one embodiment of the present invention.

FIG. 1 shows a schematic structure of an accounting and account reconciliating system in accordance with the present invention. As shown in FIG. 1, the present accounting and account reconciliating system includes paying means 1, claiming means 2, and reconciliating means 3.

The paying means 1 is for applying for accounting by a buyer in a transaction between the buyer and a supplier, and it is realized, for example, by a cellular phone of each buyer. The claiming means 2 is for claiming a counter value in the transaction by the supplier, and it is a terminal used by the supplier. The reconciliating means 3 is for arbitrating the account reconciliation in the transaction, and it is a terminal administered by a communication server, etc.

The paying means 1, claiming means 2, and reconciliating means 3 each has communication means for communicating between parties. The paying means 1 and the claiming means 2 are capable of short-distance wireless communications therebetween through their IR communication functions. The claiming means 2 and the reconciliating means 3 can communicate each other via a network such as the Internet. The reconciliating means 3 and the paying means 1 can communicate each other, for example, through a private digital network of the communication server.

The following describes structures of the paying means 1, claiming means 2, and reconciliating means 3 in this order.

Figure 2:
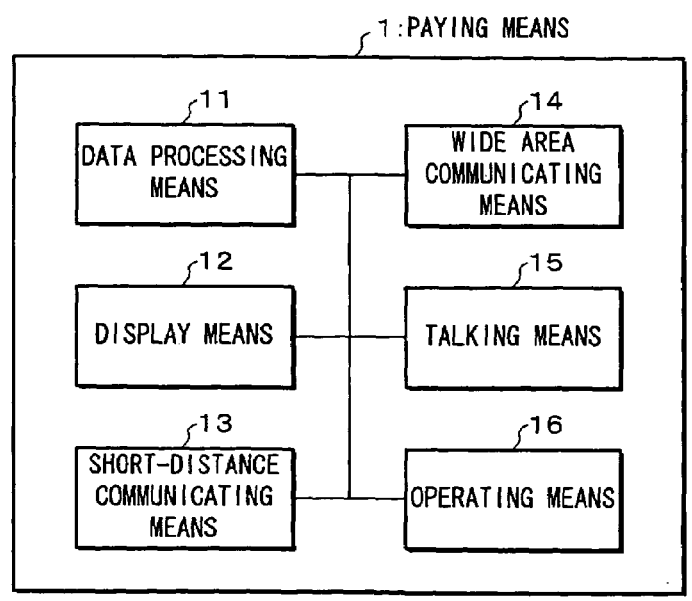
FIG. 2 is a block diagram showing a schematic structure of paying means in the accounting and account reconciliating system.

FIG. 2 is a block diagram which shows a structure of the paying means 1. In the present embodiment, the paying means 1 is realized by a cellular phone or a function of the cellular phone, and it includes data processing means 11 (first data processing means), display means 12, short-distance communicating means 13 (first communicating means), wide area communicating means 14 (first communicating means), and talking means 15 and operating means 16 (operating means, information setting means).

The data processing means 11 is made up of a CPU, ROM, and RAM, etc., and carries out data processing based on a predetermined algorithm, and control of each block (each means listed above). The display means 12 is realized, for example, by a small liquid crystal display. The short-distance communicating means 13 is for short-distance communications through IR ray or weak electromagnetic wave. The wide area communicating means 14 is for carrying out communications via connection through an electromagnetic wave to a wide area network such as a cellular phone network. The talking means 15 makes up an audio interface such as a speaker and microphone. The operating means 16 is realized by push buttons, etc. Input of various information is allowed by operation of the operating means 16 by the user (buyer).

Figure 3:
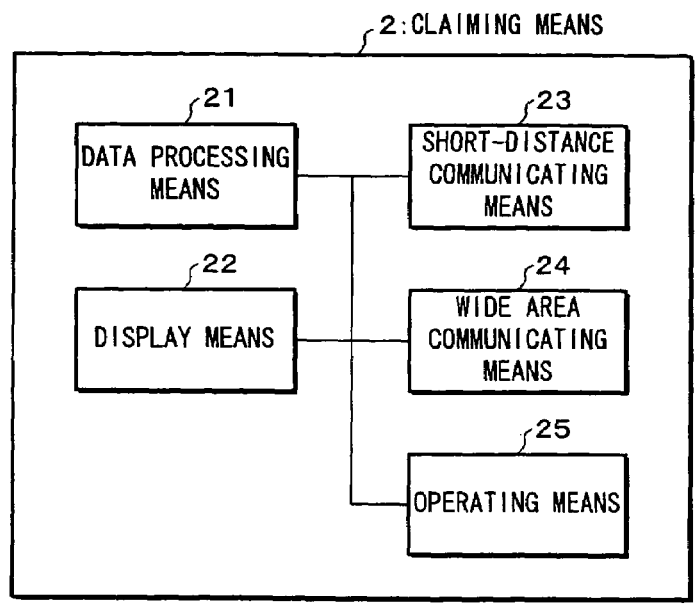
FIG. 3 is a block diagram showing a schematic structure of claiming means in the accounting and account reconciliating system.

FIG. 3 is a block diagram which shows a structure of the claiming means 2. In the present embodiment, the claiming means 2 includes data processing means 21 (third data processing means), display means 22 (confirming means), short-distance communicating means 23 (third communicating means), and wide area communicating means 24 (third communicating means) and operating means 25 (estimation input means, confirming means).

The data processing means 21 is made up of a CPU, ROM, and RAM, etc., and carries out data processing based on a predetermined algorithm, and control of each means (each means listed above). The display means 22 is realized, for example, by a small liquid crystal display. The short-distance communicating means 23 is for short-distance communications through IR ray or weak electromagnetic wave. The wide area communicating means 24 is for carrying out communications via connection through an electromagnetic wave to a wide area network such as a cellular phone network. The operating means 25 is realized by push buttons, etc.

Figure 4:
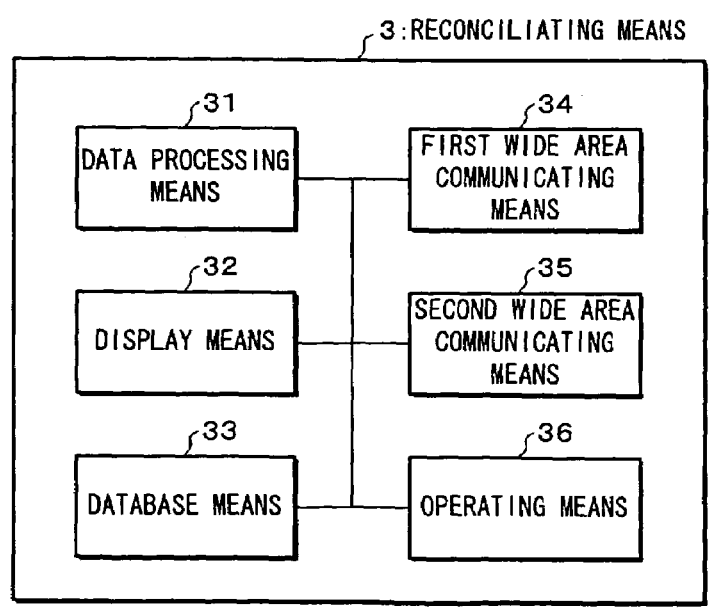
FIG. 4 is a block diagram showing a schematic structure of reconciliating means in the accounting and account reconciliating system.

FIG. 4 is a block diagram which shows a structure of the reconciliating means 3. In the present embodiment, the reconciliating means 3 includes data processing means 31 (second data processing means), display means 32, database means 33 (memory means), first wide area communicating means 34 (second communicating means), and second wide area communicating means 35 (second communicating means) and operating means 36 (condition setting means).

The data processing means 31 is made up of a CPU, ROM, and RAM, etc., and carries out data processing based on a predetermined algorithm, and control of each means (each means listed above). The display means 32 is realized, for example, by a CRT. The database means 33 stores information for recognizing terminals of the paying means 1 and claiming means 2 in communications (e.g., terminal ID), and information of payment conditions and price, etc. The first wide area communicating means 34 is for carrying out communications via connection through an electromagnetic wave to a cellular phone network, etc. The second wide area communicating means 35 is for carrying out communications via connection to a network such as the Internet. The operating means 36 is realized by a keyboard or mouse.

Figure 5:
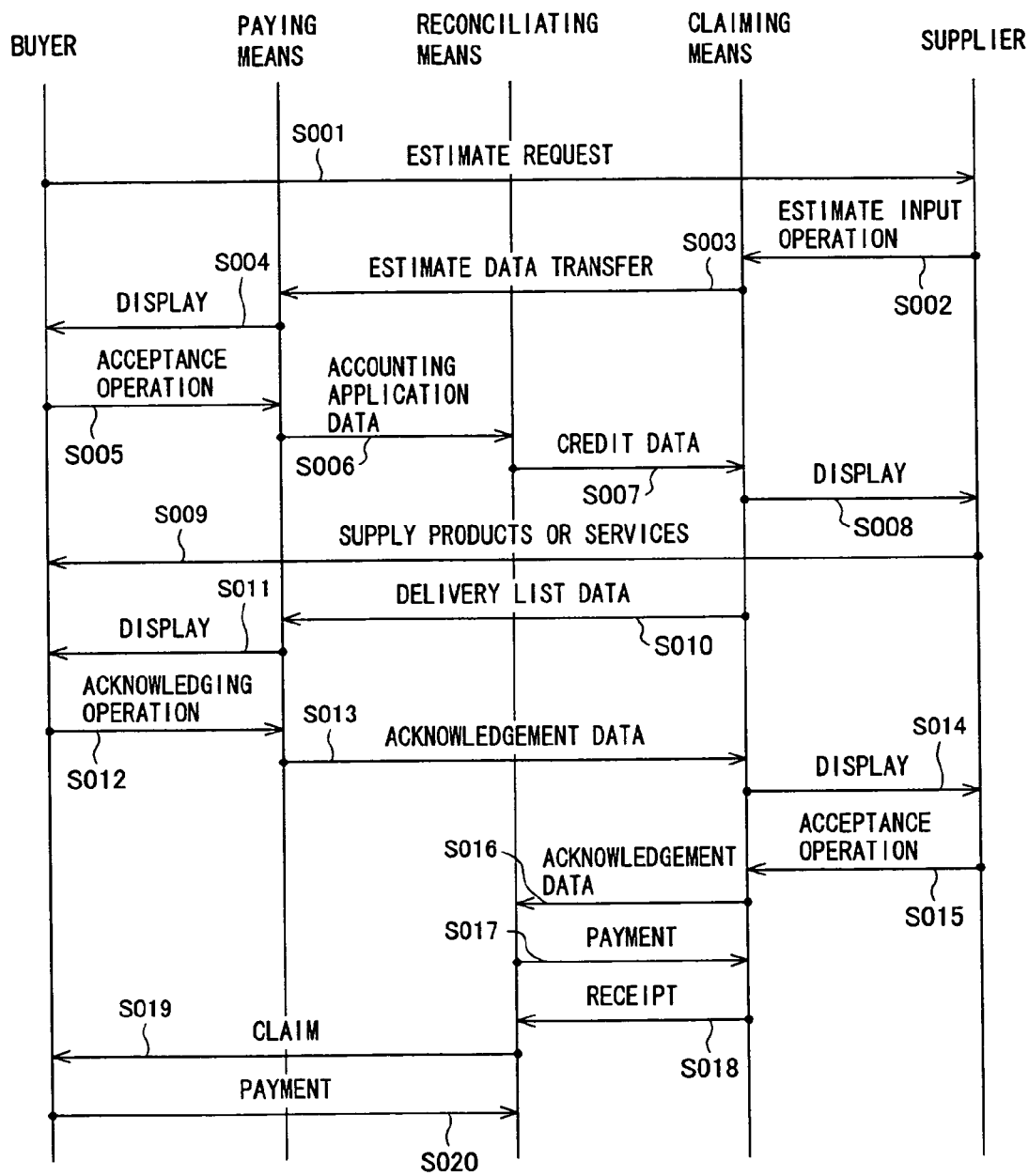
FIG. 5 is an explanatory drawing briefly showing a flow of accounting and account reconciliation processes in the accounting and account reconciliating system.

The following describes processes of the accounting and account reconciliating system in accordance with the present invention referring to FIG. 5, which briefly shows the flow of the processes. The operations of the paying means 1, claiming means 2, and reconciliating means 3 will be described in detail later.

FIG. 5 shows a process flow of transactions on the accounting and account reconciliating system of the present invention when communication between a buyer and a supplier is established.

First, the buyer indicates products or services of his wants and sends a request for an estimate to the supplier (step 001; step will be abbreviated to S hereinafter). Upon receiving the request for an estimate, the supplier responds to the request either by inputting an estimate to the claiming means 2 or by operating to find an estimate from a pre-registered "estimate list" of the claiming means 2 (S002). The claiming means 2 creates estimate data based on the estimate input operation, and sends the estimate data thus created to the paying means 1 (S003). Details of the estimate data with regard to its content will be described later.

The paying means 1 in receipt of the estimate data displays the content of the estimate (S004). If the buyer accepts the estimate content displayed on the paying means 1, the buyer makes an acceptance operation of payment on the paying means 1 (S005). When there is an acceptance operation of payment by the buyer, the paying means 1 creates accounting application data and sends it to the reconciliating means 3 (S006). On the other hand, when there is no acceptance operation of payment by the buyer, or there is a rejection operation of payment, the paying means 1 destroys the estimate data received.

The accounting application data is the data for applying for accounting and account reconciliation for the products or services ordered by the buyer to the supplier, which details will be described later.

The reconciliating means 3 in receipt of the accounting application data from the buyer creates electronic credit data (simply "credit data" hereinafter) based on the accounting application data. The reconciliating means 3 then finds the claiming means 2 which has created the estimation data from a claiming means ID in the estimation data contained in the accounting application data, and sends the credit data to the claiming means 2 involved (S007), and stores the content of the credit data in the database means 33.

The credit data is the data which guarantees reconciliation of accounts by the reconciliating means 3 for the product or services and which contains information specifying conditions of transactions on the products or services, details of which will be described later.

The claiming means 2 in receipt of the credit data displays required content on the display means 22 (S008). The supplier then supplies the products or services to the buyer based on the content of the credit data displayed (S009).

Here, in case where the credit data cannot be executed according to its content due to shortage in inventory, etc., the claiming means 2 may ask the paying means 1 and/or reconciliating means 3 for cancellation of the process, and either sends executable estimation data to the paying means 1, or sends only a corrected portion of the previously sent estimation data.

The data processing means 21 of the claiming means 2 creates delivery list data for requesting the paying means 1 to issue acknowledgement data (electronic record) which indicates whether the transaction satisfied the transaction conditions specified in the credit data, and thus the buyer. The data processing means 21 then sends the delivery list data to the paying means 1 by the short-distance communicating means 23 (S010). Details of the acknowledgement data with regard to its content will be described later.

The paying means 1 in receipt of the delivery list data displays the delivery list on the display means 12 (S011). The buyer who has received the products or services confirms whether the content of the products or services matches the content of the delivery list displayed, and makes an receiving operation on the paying means 1 for the delivery list data received (S012). The paying means 1, by this receiving operation, creates acknowledgement data for the delivery list data and sends it to the claiming means 2 by the short-distance communicating means 13 (S013).

The claiming means 2 in receipt of the acknowledgement data displays an acknowledgement corresponding to the acknowledgement data to the supplier (S014). When the supplier makes an acknowledgement acceptance operation by the operating means 25 (S015), the wide area communicating means 24 sends the acknowledgement data to the reconciliating means 3 (S016). Note that, the acceptance operation may be omitted.

The reconciliating means 3 in receipt of the acknowledgement data compares the transaction content descripted in the credit data with the acknowledgement data, and, when predetermined conditions are met (when the content of the acknowledgement data satisfies the transactions conditions in the credit data), purchases the acknowledgement data and the purchase is notified to the claiming means 2, and pays money of the purchase to the claiming means 2 (S017).

The claiming means 2, upon confirming purchase and payment of money by the reconciliating means 3, sends data which corresponds to a receipt to the reconciliating means 3 (S018). The reconciliating means 3 then bills the buyer for the payment of the counter value (S019), and the buyer pays the counter value by a predetermined payment method, for example, such as transfer to his/her bank account (S020).

Figure 6:
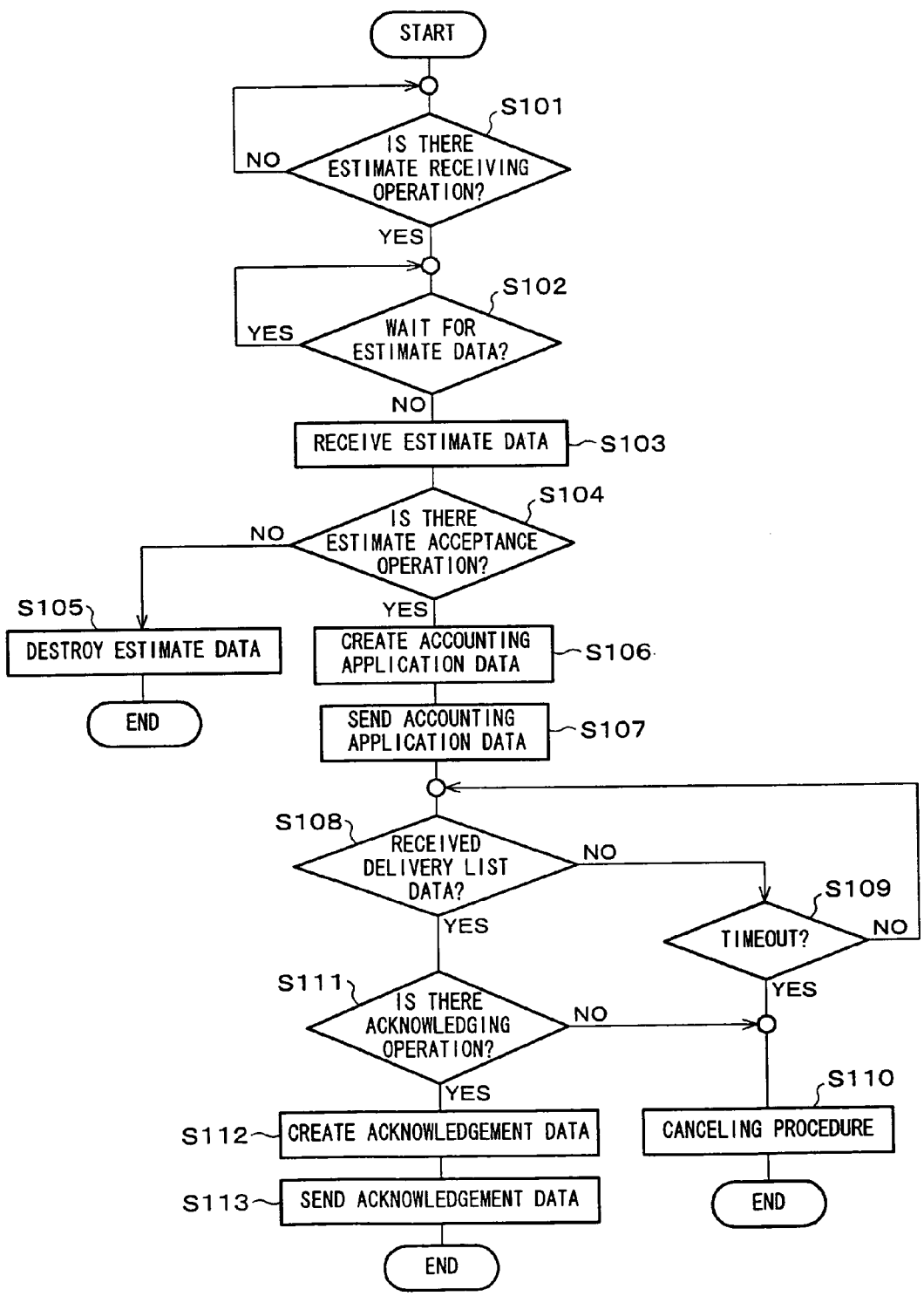
FIG. 6 is a flowchart showing a process flow in the paying means.

The following describes processes in the paying means 1 in detail referring to FIG. 6.

In the paying means 1, when the buyer makes the estimate receiving operation by the operating means 16 (S101), the data processing means 11 operates the short-distance communicating means 13 and waits for the estimate data from the short-distance communicating means 23 of the claiming means 2 (S102). Note that, when there is no reception of the estimate data for an extended period, waiting of estimate data by the operating means 16 may be interrupted as one can easily imagine and such a process is not included in the flow. When the estimate data is received (S103), the data processing means 11 displays the content of the estimate data received on the display means 12 and aborts the operation of the short-distance communicating means 13.

Here, if the operating means 16 makes a rejection operation of the estimate (S104), the data processing means 11 destroys the estimate data (S105). On the other hand, if the data processing means 11 makes an acceptance operation of the estimate (S104), the data processing means 11, after confirming and setting various conditions for the buyer by the display means 12 and the operating means 16, creates accounting application data by a predetermined procedure (algorithm) (S106).

Here, the various conditions include effective period of accounting application, delivery date, delivery method, possibility of separate delivery, conditions associated with delivery, and due date of payment from the bank. Note that, these are cases where these conditions are not set depending on circumstances. These various conditions are added as additional information to the accounting application data by the data processing means 11. The wide area communicating means 14 sends the accounting application data created to the reconciliating means 3 (S107).

Note that, the conditions associated with delivery as listed above include ① setting a level of maintenance service, ② conditions of sending products one by one as it becomes available or altogether at once when they become available, when a plurality of products are to be sent, and ③ whether it is needed to install or set up the products sent, etc.

Upon sending the accounting application data by the wide area communicating means 14, the data processing means 11 operates the short distance communicating means 13 again and waits for delivery list data from the short-distance communicating means 23 of the claiming means 2 (S108). The delivery list data is the data without unnecessary part of the estimation data, but is substantially the same as the estimation data in terms of its content.

When the delivery list data is received within a predetermined time from the time the accounting application data was sent, the data processing means 11 displays the reception of the data on the display means 12, and waits for a receiving operation or non-receiving operation by the operating means 16 (S111). Note that, the "predetermined time" refers to the time specified in the accounting application data or time which has been set beforehand by the paying means 1 in accord with a predetermined algorithm.

If the delivery list data was not received within the predetermined time (S108, S109), or if the non-receiving operation was carried out after the delivery list data was received (S111), the data processing means 11 goes to a canceling procedure based on a predetermined algorithm which is specified in the accounting application data or which has been set beforehand in the paying means 1 (S110).

On the other hand, if the operating means 16 carries out the receiving operation, the data processing means 11 creates acknowledgement data (S112), and the short-distance communicating means 13 sends the acknowledgement data created to the claiming means (S113). The acknowledgement data contains information of whether the products or services in the delivery list data were received by the buyer.

Figure 7:
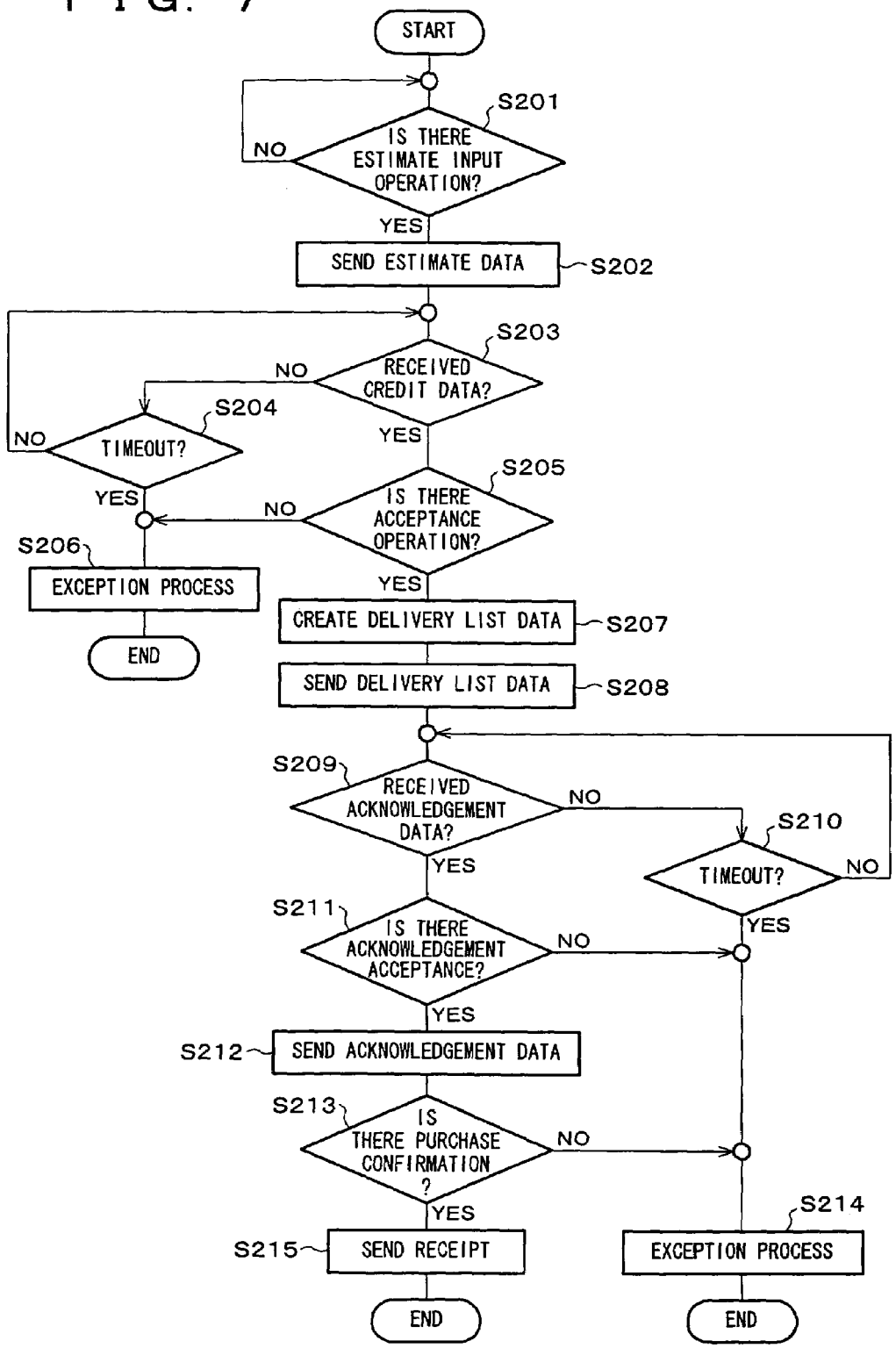
FIG. 7 is a flowchart showing a process flow in the claiming means.

The following describes processes in the claiming means 2 in detail referring to FIG. 7.

In the claiming means 2, when the supplier makes an estimate input through the operating means 25 in response to the estimate request from the buyer with regard to the products or services of interest (S201), the data processing means 21 operates the short-distance communicating means 23 to send estimate data to the paying means 1 (S202). Then, the data processing means 21 operates the wide area communicating means 24 and waits for credit data which is sent from the reconciliating means 3 (S203, S204).

If the credit data was received in S203 within a predetermined time from the time the estimate data was sent, the data processing means 21 displays various conditions contained in the credit data on the display means 22, and waits for an acceptance operation of the supplier through the operating means 25 (S205). Note that, the predetermined time refers to the time specified in the estimate data, or time which has been set beforehand in the claiming means 2 in accord with a predetermined algorithm. Also, the display means 22 and operating means 25 make up confirming means for having the supplier confirm the content of the credit data.

On the other hand, if there is no acceptance operation, or there is a rejection operation in S205, or if there is no reception of the credit data within the predetermined time in S203 and S204, the data processing means 21 carries out a predetermined exception process (S206).

The exception process is the process which is specified in the estimate data or which has been set beforehand in the claiming means 2. Specifically, such an exception process includes destruction of credit data, termination of product or service supply, and a request for changing conditions for the reconciliating means 3 or paying means 1.

If there is an acceptance operation in S205, the data processing means 21 creates delivery list data by a predetermined procedure (algorithm) based on the content of the acceptance operation and/or content of the credit data (S207). The data processing means 21 then operates the short-distance communicating means 23 to send the delivery list data created to the paying means 1 (S208).

Parallel to the transmission of the delivery list data, the supplier supplies the products or services to the buyer.

The data processing means 21 continuously operates the short-distance communicating means 23 and waits for acknowledgement data from the paying means 1 (S209). The acknowledgement data is created by the paying means 1 for the products or services supplied from the supplier to the buyer, and for the reception of the delivery list data.

When the acknowledgement data is received within a predetermined time from the time the delivery list data was sent (S209, S210), the data processing means 21 aborts the operation of the short-distance communicating means 23, and displays the content of the acknowledgement data received on the display means 22. Note that, the predetermined time refers to the time which is specified in the credit data, or time which has been set beforehand by a predetermined algorithm in the claiming means 2.

When the supplier carries out the process of acknowledgement acceptance via the operating means 25 (S211), the data processing means 21 operates the wide area communicating means 24 to send the acknowledgement data to the reconciliating means 3 (S212). Then, the data processing means 21, upon confirmation of purchase of the acknowledgement corresponding to the acknowledgement data by the reconciliating means 3 (S213), operates the wide area communicating means 24 to send data corresponding to a receipt to the reconciliating means 3 (S215). Note that, the purchase confirmation can be effectuated by checking whether money has been transferred by the reconciliating means 3, for example, to the bank account specified by the supplier.

On the other hand, when there is no reception of acknowledgement data within the predetermined time in S209 and S210, in the event where there was no process of acknowledgement acceptance in S211 or there was no confirmation of acknowledgement purchase by the reconciliating means 3 in S213, the exception process is carried out in S214 in accord with a predetermined algorithm which is specified in the credit data or which is set beforehand in the claiming means 2.

The following describes an example of the exception process in S214.

① The case where the acknowledgement data was not received within the predetermined time in S210.

First, each means and communication paths are checked for error or trouble. If no error is found, the data processing means 21 requests the paying means 1 to send the acknowledgement data again. If the buyer does not respond via the paying means 1 to the request for re-transmission of the acknowledgement data while the delivery content of the products, etc., does not have any problem, the data processing means 21 requests, as an exceptional measure, the reconciliating means 3 for the pre-payment of the products supplied to the buyer so as to redeem money. Then, mediation which might follow may be conducted between the administrator of the reconciliating means 3 and the buyer, or, alternatively, by directly contacting the buyer from the supplier.

Further, if it is the buyer's fault, the data processing means 21 may ask the reconciliating means 3 to take a punitive measure against the buyer, which prevents future services to the buyer even when the buyer makes another accounting application via the paying means 1. On the other hand, if it is the supplier's fault, the data processing means 21 may cancel the contract with the supplier in the present system.

② The case where the acknowledgement data was not accepted in S211.

In case where the acknowledgement data received was broken, each means and communication paths are checked for error or trouble. If no error is found, the data processing means 21 requests the paying means 1 for re-transmission of the acknowledgement data. Further, in case where the buyer has manipulated the acknowledgement data while no error or trouble is found in each means or communication paths and the delivery content of the products, etc., does not have any problem, the data processing means 21 requests, as an exception measure, the reconciliating means 3 for the pre-payment of the products supplied to the buyer so as to redeem money. Then, mediation which might follow may be conducted between the administrator of the reconciliating means 3 and the buyer, or, alternatively, by directly contacting the buyer from the supplier.

If it is the buyer's or supplier's fault as above, the same processes as described above may be carried out.

③ The case where purchase confirmation failed in S213.

When there was no purchase, the supplier asks the reconciliating means 3 for the reason of no purchase. If it was found that the acknowledgement data sent to the reconciliating means 3 was broken, the data processing means 21 re-transmits the acknowledgement data to the reconciliating means 3. Further, in case where the contract, for example, between the administrator of the reconciliating means 3 and the supplier has been terminated, any suitable measure for the re-contract is taken.

Figure 8:
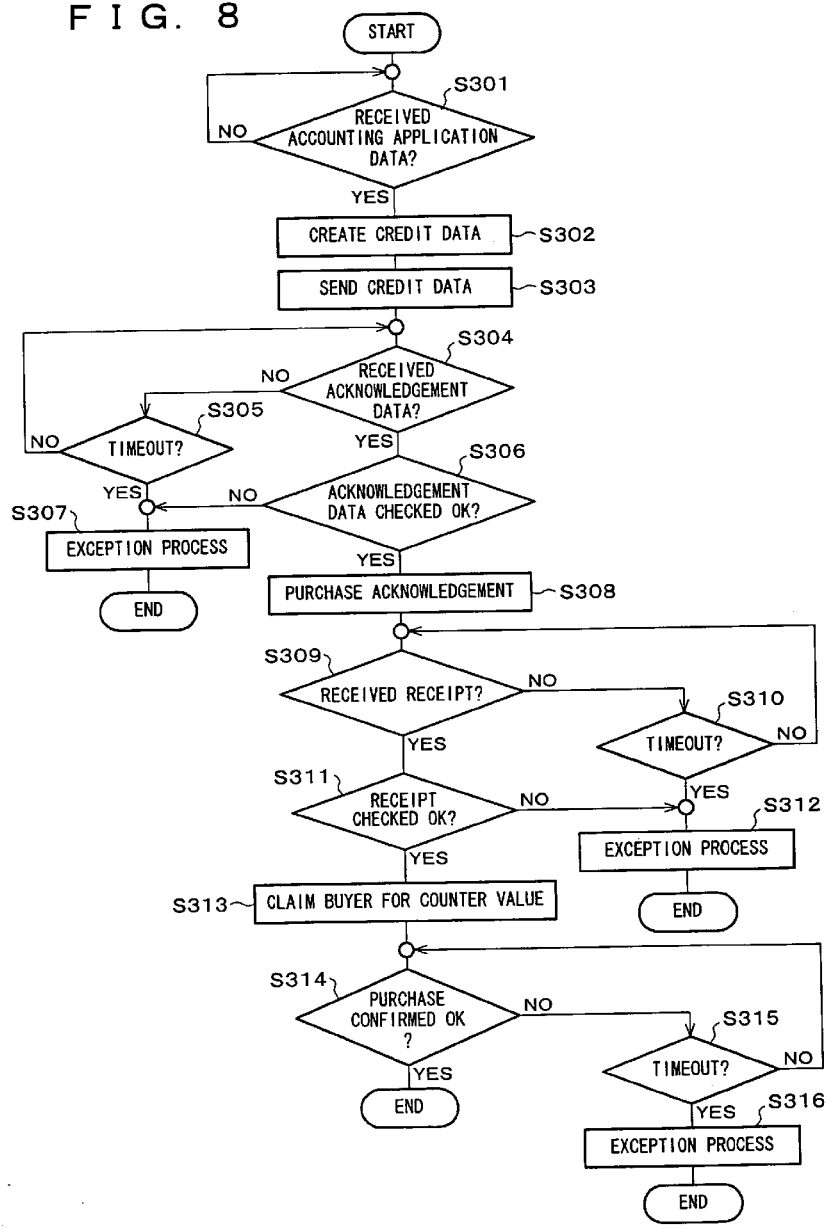
FIG. 8 is a flowchart showing a process flow in the reconciliating means.

The following describes processes in the reconciliating means 3 referring to FIG. 8.

In the reconciliating means 3, when the first wide area communicating means 34 receives the accounting application data which is sent from the paying means 1 (S301), the data processing means 31 compares the content of the accounting application data received, account balance of the buyer, upper limit of purchase per month, and upper limit of money which can be paid by single reconciliation, and if they do not have any problem, creates credit data based on the accounting application data received (S302). Note that, the upper limit of payment may be decided for each supplier. The data processing means 31 then operates the second wide area communicating means 35 to send the credit data to the claiming means 2 involved (S303).

The credit data, being so central to the transaction, is created by collating it with data stored in the database means 33 while paying extra caution when specifying the paying means 1 and claiming means 2. With regard to various conditions specified in the credit data, such as transaction conditions like delivery date of products, delivery method, possibility of separate delivery, and other conditions associated with delivery, and such as purchase conditions like price of acknowledgement data, can be set or changed as required in accord with a predetermined algorithm, or by the operating means 36. Additionally, the content of the credit data is stored in the database means 33.

After sending the credit data to the claiming means 2, the delivery list data and acknowledgement data are transmitted between the paying means 1 and claiming means 2. Then, when the acknowledgement data from the claiming means 2 is received by the second wide area communicating means 35 within a predetermined time after sending the credit data to the claiming means 2 (S304), the data processing means 31 compares the content of the corresponding credit data stored in the database means 33 with the content of the acknowledgement data received, in accord with a predetermined procedure (S306). Note that, the predetermined time is the time which is specified in the credit data, or time which has been set beforehand in the reconciliating means 3 in accord with a predetermined algorithm.

If the acknowledgement data was authenticated in S306 (when the content of supplied products or services contained in the acknowledgement data satisfies transaction conditions contained in the credit data), the data processing means 31 purchases the acknowledgement at the price which was set in the credit data (S308). On the other hand, if there is no reception of the acknowledgement data within the predetermined time (S304, S305), or if the acknowledgement data was not authenticated in S306, an exception process is carried out based on a predetermined algorithm which is specified in the credit data or which has been set beforehand in the reconciliating means 3 (S307).

Note that, the exception process of S307 is basically the same as the exception process in S214. That is, when there is no trouble in each means and communication paths upon checking, mediation is suitably carried out between the parties of interest. The exception processes in S312 and S316 described below are basically also the same as above.

When there is reception of data which corresponds to a receipt by the claiming means 2 within a predetermined time from the purchase of the acknowledgement by the reconciliating means 3 in S308 (S309), the data processing means 31 checks the content of the receipt for error (S311). Note that, the predetermined time refers to the time which is specified in the credit data, or time which has been set beforehand in the reconciliating means 3 in accord with a predetermined algorithm. If the content of the receipt is correct, the data processing means 31 bills the buyer for the payment of the counter value in the transaction at the timing which is specified in the credit data, or the timing which has been set beforehand in the reconciliating means 3 in accord with a predetermined algorithm (S313).

On the other hand, when there is no reception of data which corresponds to a receipt from the claiming means 2 within the predetermined time from the purchase of the acknowledgement by the reconciliating means 3 in S308 (S309, S310), or when an error is found in S311 in the receipt data received, the data processing means 31 carries out an exception process which is specified in the credit data, or which has been set beforehand in the reconciliating means 3 in accord with a predetermined algorithm (S312).

The transaction process is finished upon confirmation of the payment of the counter value within a predetermined time in S314 after billing the buyer for the payment of the counter value in S313. Note that, the predetermined time refers to the time which is specified in the credit data, or time which has been set beforehand in the reconciliating means 3 in accord with a predetermined algorithm. On the other hand, when there is no confirmation of the payment of the counter value within the predetermined time (S314, S315), a predetermined exception process which is specified in the credit data, or which has been set beforehand in the reconciliating means 3 is carried out (S316).

The following describes data structures of the estimate data, accounting application data, credit data, and acknowledgement data in this order.

Figure 9:
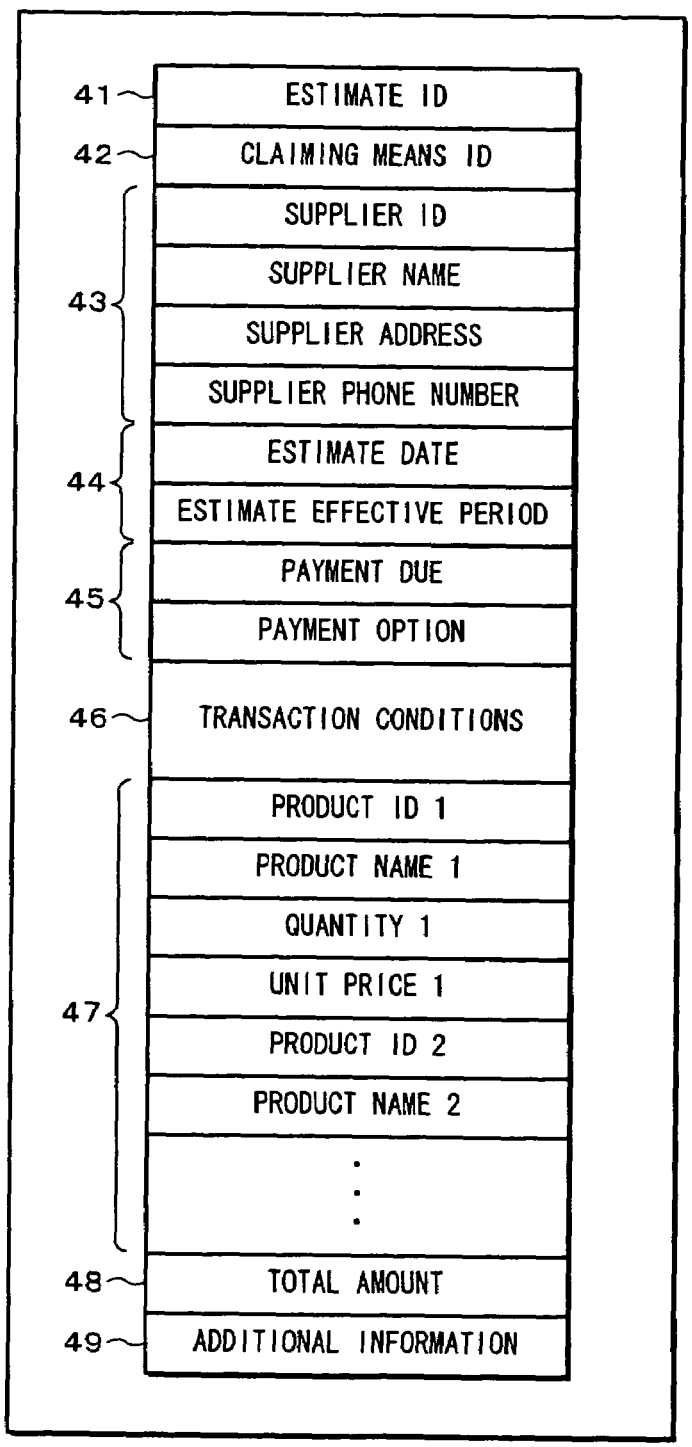
FIG. 9 is an explanatory drawing showing a schematic structure of estimate data sent to the paying means from the claiming means.

FIG. 9 shows one content example of the estimate data. The estimate data is chiefly made up of information such as estimate ID 41, claiming means ID 42, supplier information 43, estimate due information 44, payment information 45, transaction conditions 46, product information 47, total amount 48, and additional information 49.

The estimate ID 41 is the ID for identifying each estimate data. The claiming means ID 42 is the ID for identifying the claiming means 2 which has transferred the estimate data to the paying means 1. The supplier information 43 includes a supplier ID for identifying the supplier who has created the estimate, and the name, address, and phone number of the supplier. The estimate due information 44 is the information which relates to an estimate date and effective period of the estimate.

The payment information 45 includes information of payment due and payment options. The payment due specifies the time period from the supply of products or services to the completion of payment. The payment options include possibility of payment in installments or the number of installments.

The transaction conditions 46 include information offering an option of shipping or supplying products or services at once, information offering an option of shipping or supplying products or services separately, information offering options when shipping or supplying products or services separately (how the plurality of products or services should be shipped or supplied separately to the buyer), and information which relates to delivery of products or services, as well as information which specifies processes in case where the delivery failed.

The transaction conditions 46 also include information which specifies a usual payment method of the counter value, and an alternate payment method in replacement of the usual payment method. The usual payment method of the counter value, for example, is the method by money transfer to or payment from a bank account, and the alternate payment method is the method by a credit card, for example. The transaction conditions 46 further include information which specifies the option of choosing a credit card which can be used.

The data processing means 11 of the paying means 1 asks the buyer via the display means 12 to confirm whether the payment of the counter value is to be made by the alternate method in case where the payment of the counter value by the usual payment method fails due to trouble in the present system, thereby ensuring transactions even in case of an unexpected trouble in the present system.

The product information 47 is the information which relates to a product ID for identifying the products or services to be supplied, a product name (service name), and the unit price and number of products or services to be supplied. These information relating to products or services is managed in the form of a list for each product or service supplied. The total amount 48 indicates the total amount of the estimate.

The additional information 49 is the information which is added to the estimate data as required, and it includes, for example, due information and process information. The due information is the information which specifies the time period from the transmission of the estimate data to the paying means 1 by the claiming means 2 to the reception of the credit data from the reconciliating means 3. The process information specifies the exception process in S206 of FIG. 7.

Figure 10:
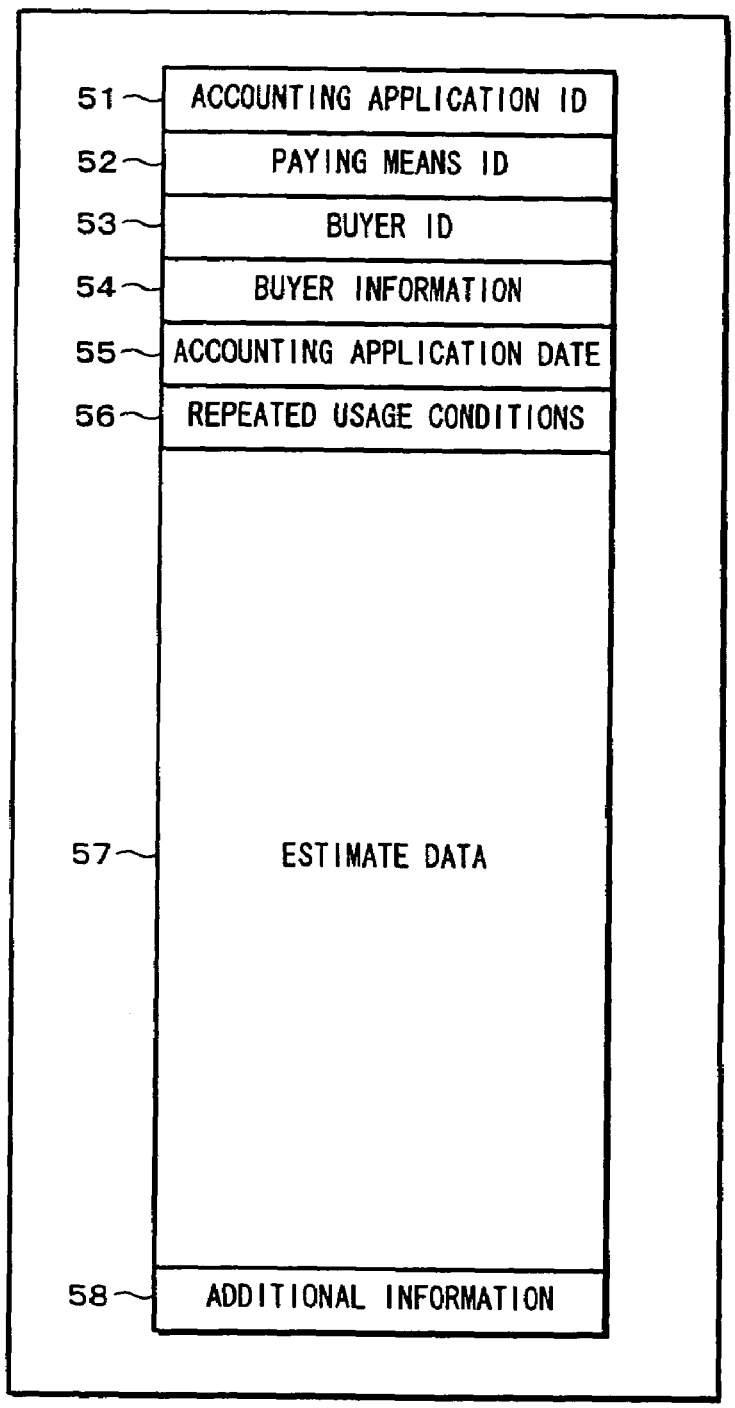
FIG. 10 is an explanatory drawing showing a schematic structure of accounting application data sent to the reconciliating means from the paying means.

The following describes the accounting application data. FIG. 10 shows a content example of the accounting application data. The accounting application data is chiefly made up of information such as accounting application ID 51, paying means ID 52, buyer ID 53, buyer information 54, accounting application date 55, repeated usage conditions 56, estimate data 57, and additional information 58.

The accounting application ID 51 is the ID for identifying the accounting application data. The paying means ID 52 is the ID for identifying the paying means 1 which has made accounting application. The buyer ID 53 is the ID for identifying the buyer who has agreed to the estimate content and accepted payment. The buyer information 54 is the information which is added to the accounting application data in case where the buyer does not request for secrecy, which includes, for example, name, address, and phone number of the buyer. The accounting application date 55 is the date the accounting application data was created.

The repeated usage conditions 56 is the information which relates to repeated usage conditions such as setting whether to use the same accounting application data repeatedly for a predetermined number of times as credited data, in the case where similar transactions are expected in the future, and setting of the number of predetermined times.

The estimate data 57 is the estimate data described above, in which payment options are selected or indicated by the buyer as required. Thus, the accounting application data includes the estimate data sent from the claiming means 2.

The additional information 58 in the information which is added as required to the accounting application data, and it includes, for example, due information and process information. The due information is the information which specifies the time period from the transmission of the accounting application data to the reconciliating means 3 by the paying means 1 to the reception of the delivery list data by the claiming means 2. The process information relates to processes of a cancelling procedure of products or services purchased.

Figure 11:
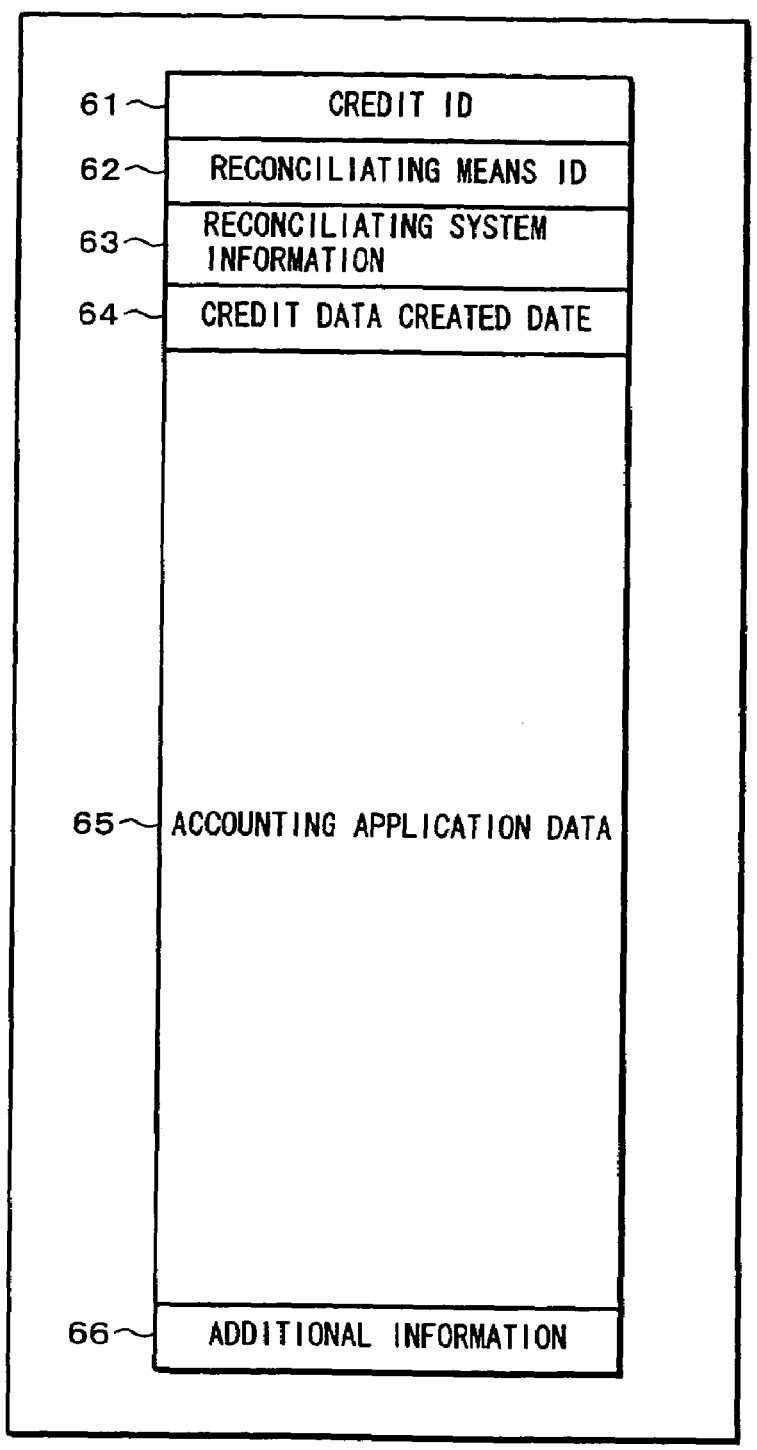
FIG. 11 is an explanatory drawing showing a schematic structure of credit data sent to the claiming means from the paying means.

The following describes the credit data. FIG. 11 shows a content example of the credit data. The credit data is chiefly made up of information such as credit ID 61, reconciliating means ID 62, reconciliating system information 63, credit data created date 64, accounting application data 65, and additional information 66.

The credit ID 61 is the ID for identifying the credit data. The reconciliating means ID 62 is the ID for identifying the reconciliating means 3 which issues the credit data. The reconciliating system information 63 is the information which relates to location or emergency address of the system (e.g., claiming means 2 and reconciliating means 3) in case of trouble such as system failure. The credit data created date 64 is the information which relates to the date the reconciliating means 3 created the credit data. The accounting application data 65 is the accounting application data which includes a request for data in reconciliation, addition or change of reconciliating conditions, and selection or indication of options, all made by the reconciliating means 3 as required based on a predetermined algorithm.

The additional information 66 is the information which is added as required to the credit data, and it includes, for example, process information, transaction conditions, and due information. The process information specifies each of the exception processes in S214 of FIG. 7, S307, S312, and S316 of FIG. 8. The transaction conditions are the information of purchase conditions as described, such as delivery of products, delivery method, possibility of separate delivery, conditions associated with delivery, and price of the acknowledgement.

The due information includes, along with other information, ① information which specifies the time period from the transmission of the delivery list data to the paying means 1 to the reception of the acknowledgement data in the claiming means 2, ② information which specifies the time period from the transmission of the credit data to the claiming means 2 to the reception of the acknowledgement data in the reconciliating means 3, ③ information which specifies the time period from the purchase of the acknowledgement to the reception of data which corresponds to a receipt in the reconciling means 3, and ④ information which specifies the time period from the billing of the counter value to the buyer to the payment of the counter value, and which specifies the timing of billing the counter value payment in the reconciling means 3.

Figure 12:
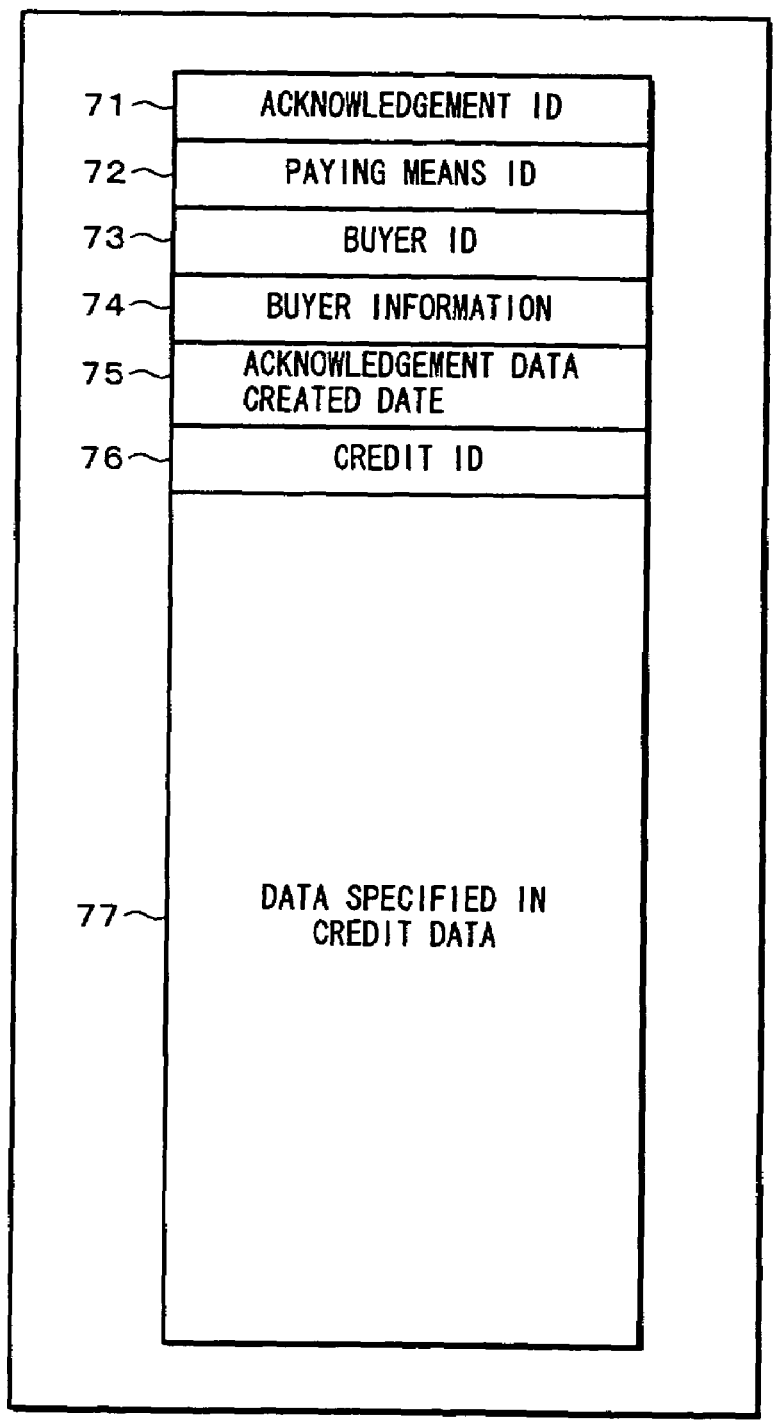
FIG. 12 is an explanatory drawing showing a schematic structure of acknowledgement data which is sent to the claiming means from the paying means, and to the reconciliating means from the claiming means.

The following describes the acknowledgement data. FIG. 12 shows a content example of the acknowledgement data. The acknowledgement data is chiefly made up of information such as acknowledgement ID 71, paying means ID 72, buyer ID 73, buyer information 74, acknowledgement data created date 75, credit ID 76, and data specified in credit data 77.

The acknowledgement ID 71 is the ID for identifying the acknowledgement data. The paying means ID 72 is the ID for identifying the paying means 1 which has created the acknowledgement data. The buyer ID 73 is the ID for identifying the buyer who has operated the paying means 1. The buyer information 74 is the information added to the acknowledgement data in case where the buyer does not request for secrecy, which includes, for example, name, address, and phone number of the buyer.

The acknowledgement data created date 75 is the information which indicates the date the paying means 1 created the acknowledgement data. The credit ID 76 is the ID for identifying the credit data which corresponds to the acknowledgement data.

The data specified in credit data 77 is the information for specifying a verification level of the buyer. In the case where the verifying function of the paying means 1 includes a plurality of verifying means such as verification at a terminal level by a secret key or verification utilizing a finger print or retina, the buyer is verified by the specified verification level. For example, when supplying relatively expensive products, a higher verification level is specified.

The present embodiment adopts a so-called "post-payment method" in which the buyer makes payment after receiving products. In this case, if it is certain that products or services will be supplied to the buyer, the steps of S010 through S016 in FIG. 5 may be omitted.

Figure 13:
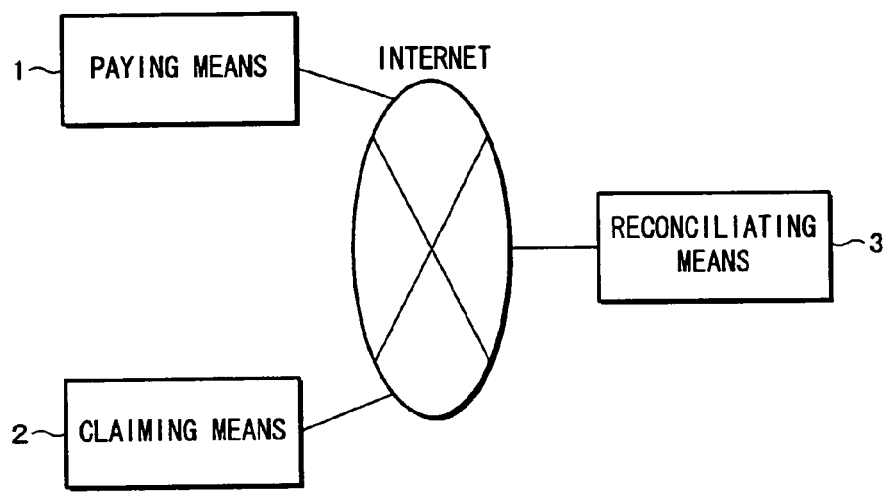
FIG. 13 is an explanatory drawing showing an example of another structure of the accounting and account reconciliating system in accordance with the present invention.

Note that, the reliability of each data in the foregoing communications and the reliability of communications itself can be improved by suitably following the procedure of a well-known symmetric key cryptographic system, public key cryptographic system, and common electronic signature by hash function. Thus, in this case, as shown in FIG. 13, the paying means 1, claiming means 2, and reconciliating means 3 may be structured to communicate each other on the Internet.

In the present embodiment, the wide area network to which the paying means is connected and the wide area network to which the claiming means is connected are realized by separate networks of the private network and the Internet network. However, evidently, these networks may be realized collectively by the Internet network, or by the private network, as shown in the structure of FIG. 13.

Further, the reconciliating means 3 may be realized, for example, by a terminal placed in retailers such as convenience stores so as to allow the buyer to carry out the procedure of counter value payment in S020 of FIG. 5 through such terminal, thereby realizing easy payment by cash.

Further, when the buyer and the supplier remain unchanged and the same transaction is repeated, the data processing means 31 of the reconciliating means 3 may use the same credit data. In this case, a procedure of inputting information distinct to the buyer and the supplier, such as ID, name, address, or a procedure of creating new credit data can be omitted. Note that, in this case, the credit ID 61 and the credit data created date 64 are not changed either, and the credit data is used repeatedly.

In the present embodiment, the buyer and the person to which products or services are supplied are identical. However, products or services can easily sent to a third person by specifying the recipient of the products or services, or the paying means 1 of the recipient in the accounting application data.

As described, in the present invention, the reconciliating means 3 creates credit data which guarantees account reconciliation of transactions by the reconciliating means 3, and transactions and account reconciliation of products or services are carried out based on this credit data, making it possible to make transactions and account reconciliation even when a buyer does not have a credit card which guarantees the identity and credit of the buyer. Therefore, transactions and account reconciliation are ensured without requiring the buyer to have a credit card.

Further, from the suppliers' stand point, account reconciliation of orders from a buyer whose identity and credit are unknown are guaranteed by the reconciliating means 3 which issues credit data, thereby allowing the suppliers to supply products or services with confidence.

Further, unlike account reconciliation by a credit card where redemption of the counter value for the supplied products or services takes a month or so, by the system where the reconciliating means 3 purchases an acknowledgement, redemption of money can be made instantly, making it possible to hedge various risks.

Further, from the buyers' stand point, by specifying conditions such as a request for certifying quality or quantity of products or services, or due date of delivery in the data of credit data, the buyer can receive products or services without errors and with confidence in the transaction.

Second Embodiment

The following will describe another embodiment of the present invention referring to the attached drawing. Note that, those elements having the same arrangements as those described in the First Embodiment are given the same reference numerals and explanations thereof are omitted here.

Figure 14:
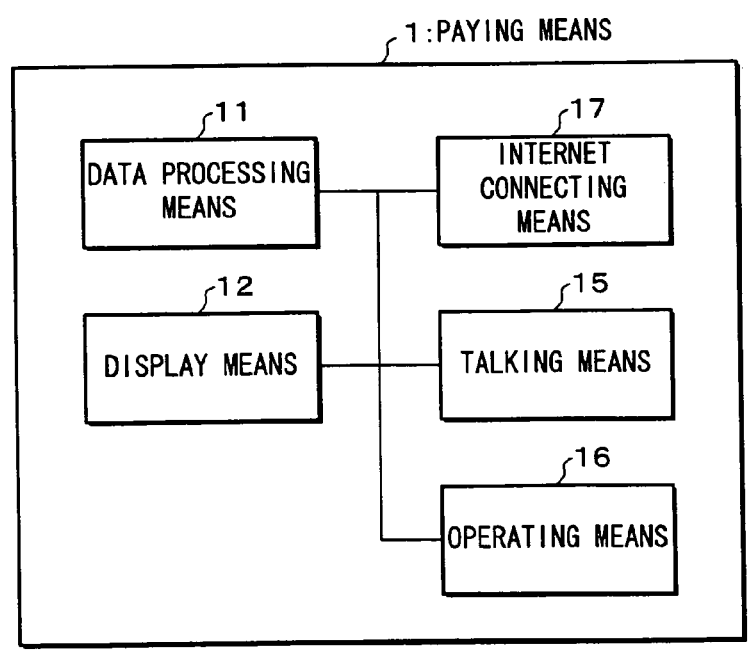
FIG. 14 is a block diagram showing a schematic structure of paying means in an accounting and account reconciliating system in accordance with another embodiment of the present invention.

The present embodiment relates to transactions wherein no communication is established between the buyer and the supplier. Thus, the paying means 1 of FIG. 2, the claiming means 2 of FIG. 3, and the reconciling means 3 of FIG. 4 are not provided with the short-distance communicating means 13, the short-distance communicating means 23, and the second wide area communicating means 35, respectively. Instead, the wide area communicating means 14 and 24 of FIGS. 2 and 3, and the first wide area communicating means 34 of FIG. 4 are realized by Internet connecting means 17 (first communicating means), Internet connecting means 26 (second communicating means), and Internet connecting means 37 (third connecting means) which are capable of wireless or wired communications. FIG. 14, FIG. 15, and FIG. 16 show respective structures of paying means 1, claiming means 2, and reconciling means 3, respectively, of the present embodiment. Further, the entire system structure is as shown in FIG. 13, which, however, is different from the First Embodiment in terms of the way processes are carried out. The following will describe the processes in an accounting and account reconciliating system of the present embodiment referring to FIG. 17.

Figure 17:
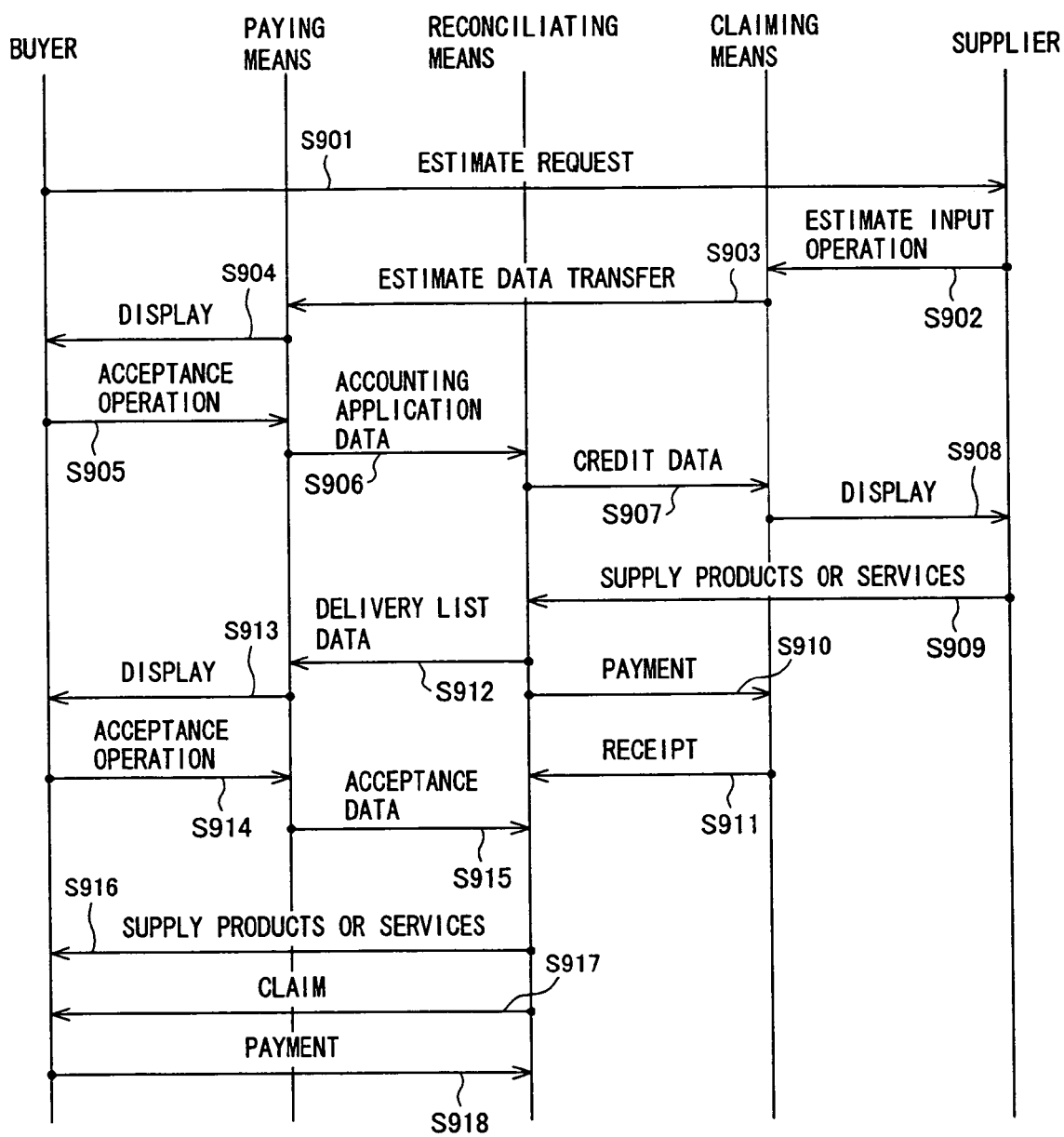
FIG. 17 is an explanatory drawing briefly showing a flow of accounting and account reconciliation processes in the accounting and account reconciliating system.

FIG. 17 shows a process flow of transactions wherein purchase by a buyer is arbitrated by the reconciliating means 3 while no communication is established between the buyer and the supplier.

First, the buyer indicates products or services of his wants and sends a request for an estimate to the supplier (S901). Upon receiving the request for an estimate, the supplier responds to the request either by inputting an estimate to the claiming means 2 or by operating to find an estimate from a pre-registered "estimate list" of the claiming means 2 (S902). The claiming means 2 creates estimate data based on the estimate input operation, and sends the estimate data thus created to the paying means 1 (S903).

The paying means 1 in receipt of the estimate data displays the content of the estimate (S904). If the buyer accepts the estimate content displayed on the paying means 1, the buyer makes an acceptance operation of payment on the paying means 1 (S905). When there is an acceptance operation of payment by the buyer, the paying means 1 creates accounting application data and sends it to the reconciliating means 3 (S906). On the other hand, when there is no acceptance operation of payment by the buyer, or there is a rejection operation of payment, the paying means 1 destroys the estimate data received.

The data processing means 31 of the reconciliating means 3 in receipt of the accounting application data from the buyer via the Internet connecting means 37 creates credit data based on the accounting application data. The reconciliating means 3 then finds the claiming means 2 which has created the estimation data from a claiming means ID in the estimation data contained in the accounting application data, and sends the credit data to the claiming means 2 involved (S907), and stores the content of the credit data in the database means 33.

In this case, the data processing means 31 constitutes credit data creating means which receives the accounting application data via the Internet connecting means, creates the credit data based on the accounting application data received, and sends the credit data created to the claiming means 2 via the Internet connecting means, where the credit data is the data which guarantees account reconciliation of the products or services by the reconciliating means 3 and contains information which specifies transaction conditions of the products or services.

The data processing means 21 of the claiming means 2 in receipt of the credit data via the Internet connecting means 26 displays required content on the display means 22 (S908). The supplier then supplies the products or services to the reconciliating means 3 based on the content of the credit data displayed (S909).

In this case, the data processing means 21 constitutes product supply promoting means which receives via the Internet connecting means the credit data sent from the reconciliating means 3, and promotes the supplier to supply to the reconciliating means 3 products or services which satisfy the transaction conditions of the credit data received.

The data processing means 31 of the reconciliating means 3 checks for any conflict between content of the products or services supplied to the buyer and the content of the credit data, and when there is no conflict, makes payment of money for the products or services supplied to the claiming means 2 (S910). The claiming means 2 in receipt of money sends data which corresponds to a receipt of the payment to the reconciliating means 3 (S911).

Parallel to the processes in S910 and S911, the data processing means 31 of the reconciliating means 3 creates delivery list data based on the content of the products or services supplied by the supplier and sends the delivery list data created to the paying means 1 (S912).

In this case, the data processing means 31 constitutes delivery list creating means which, when received from the supplier products or services which are based on the content of the credit data and when the content of the products or services satisfy the transaction conditions in the credit data, makes payment for the products or services to the claiming means 2, creates delivery list data which indicates supply content of the products or services, and sends the delivery list created to the paying means 1.

The paying means 1 in receipt of the delivery list data from the reconciliating means 3 displays a delivery list by the display means 12 (S913). When the paying means 1 makes an acceptance operation of the buyer with respect to the delivery list by the operating means 16 (S914), the data processing means 11 of the paying means 1 creates acceptance data based on the delivery list and sends the acceptance data created to the reconciliating means 3 (S915).

Here, in the case where the paying means 1 does not receive the delivery list data for an extended period of time, the data processing means 11 of the paying means 1 makes an inquiry to the reconciliating means 3. In the event where the delivery list data is broken and the products or services have been supplied to the reconciliating means 3 by the supplier, the data processing means 11 may create a special acceptance data based on the accounting application data and send it to the reconciliating means 3 so that the buyer can receive the products or services from the reconciliating means 3.

The data processing means 31 of the reconciliating means 3 in receipt of the acceptance data supplies the products or services supplied by the supplier to the buyer (S916). Then, the reconciliating means 3 claims the buyer for the payment of the counter value (S917), and the buyer pays the counter value to the reconciliating means 3 (S918). The payment of counter value in S918 may be made by automatic withdrawal of money from the buyer's bank account.

In this case, the data processing means 31 constitutes counter value claiming means which, when received the acceptance data for the delivery list from the paying means 1, supplies the products or services supplied by the claiming means 2 to the buyer, and claims the buyer for the payment of the counter value of the products or services so as to redeem the counter value.

Note that, if it is certain that the buyer will be correctly recognized by the reconciliating means 3, the processes in S912 through S915 in the present embodiment may be omitted.

As described, as in the First Embodiment, the reconciliating means 3 creates credit data which guarantees account reconciliation of transactions by the reconciliating means 3, and transactions and account reconciliation of the products or services are carried out based on the credit data, allowing the buyer to make transactions and account reconciliation without a credit card which guarantees his identity and credit. Further, since the reconciliating means guarantees account reconciliation of transactions even for orders of products or services from a buyer whose credit is questionable, the supplier can supply products or services with confidence, as with the effects in the First Embodiment.

Further, in addition to the effects of the First Embodiment, the following effect is obtained. In the case where, for example, the reconciling means 3 has a nation-wide distributing system (may be a network when products are electronic data), while delivery may be made from the supplier to the nearest reconciling means 3, it may take time to transfer products or services to the buyer. Even in such a case, the supplier can quickly redeem a counter value for the delivered content.

The accounting and account reconciliating system in accordance with the present invention may have an arrangement including portable paying means which includes first communicating means, reconciliating means which includes second communicating means, and claiming means which includes third communicating means, wherein the paying means creates accounting application data and sends the accounting application data created to the reconciliating means via the first communicating means, and the reconciliating means creates electronic credit data based on the accounting application data sent from the paying means and sends the electronic credit data created to the claiming means via the second communicating means, and the claiming means creates electronic record data which satisfies conditions specified by the electronic credit data sent from the reconciliating means and returns the electronic record data back to the reconciliating means via the third communicating means, and the reconciliating means, upon confirmation that the electronic record data returned from the claiming means satisfies the content contained in the electronic credit data which was sent before, purchases the electronic record data from the claiming means, and thereafter bills the user for the payment of the counter value so as to redeem money.

With this arrangement, the supplier can claim redemption of money for the supplied of products or services instantly, unlike account reconciliation by a credit card which takes time.

Further, the accounting and account reconciliating system in accordance with the present invention may have an arrangement in which the paying means obtains data which is associated with accounting via communications from the claiming means when creating the accounting application data.

Also, the accounting and account reconciliating system in accordance with the present invention may have an arrangement in which the claiming means obtains data which is associated with the record via communications from the paying means when creating the electronic record data.

With these arrangements, it is ensured that the buyer receives the products or services for the payment.

Further, the accounting and account reconciliating system in accordance with the present invention may have an arrangement which specifies effective period of accounting application, delivery date, delivery method, possibility of separate delivery, conditions associated with delivery, or due date of payment from a bank, as the content of the accounting application data which is created in the paying means.

With this arrangement, the buyer has the option of choosing a transaction content which suits him/her.

Further, the accounting and account reconciliating system in accordance with the present invention may have an arrangement in which the reconciliating means specifies delivery date, delivery method, possibility of separate delivery, conditions associated with delivery, or conditions which relates to purchase of the electronic record data from the claiming means.

With this arrangement, it is possible to set suitable transaction conditions in the reconciliating means according to a paying ability of the buyer or credibility of the paying ability as judged by the supplier. Note that, the paying ability may be associated with, for example, the balance of the buyer's account designated by the buyer at the time of the payment.

Further, the accounting and account reconciliating system in accordance with the present invention may have an arrangement in which the paying means asks the buyer to confirm whether to use a credit card for the payment of the counter value in either of the paying means, claiming means, and reconciliating means in case of a problem in paying ability of the buyer or credibility of the paying ability as judged by the supplier, or in case of a technical trouble.

With this arrangement, transactions are ensured even in case where there is a problem in paying ability of the buyer or credibility of the paying ability as judged by the supplier, or in case of technical troubles in the system.

Further, the accounting and accounting reconciliating system in accordance with the present invention may have an arrangement in which, when the supplier cannot accept the conditions contained in the received electronic credit data from the reconciliating means, the claiming means either sends a request to the reconciliating means to change the conditions, or reject the electronic credit data.

With this arrangement, the supplier will not be forced by the buyer or the conditions set in the reconciliating means to engage in transactions which are disadvantageous to the supplier.

Further, the accounting and account reconciliating system in accordance with the present invention may have an arrangement in which the same credit data is used repeatedly for several times in the case where the user (buyer) and the supplier remain unchanged.

With this arrangement, when repeating similar transactions, it is possible to save communication expense and omit extra processes.

Further, an accounting reconciliating server in accordance with the present invention may have an arrangement which receives via communicating means accounting application data created in the paying means, and creates electronic credit data based on the accounting application data received, and sends the electronic credit data created to the claiming means via the communicating means, and when received from the supplier products or services which are based on the content of the electronic credit data and when the content satisfies conditions in the electronic credit data, pays a counter value of the products or services to the claiming means, and creates delivery list data which indicates supply content of the products or services, and sends the delivery list data created to the paying means, and when received acceptance data from the paying means, supplies to the buyer the products or services supplied by the supplier, and claims the buyer for the payment of the counter value of the products or services so as to redeem the counter value.

Note that, Domestic Re-Application of PCT International Publication No. WO99/09502 (published date: Mar. 14, 2000; International Publication Date: Feb. 25, 1999) discloses an account reconciliating method in which electronic values are accumulated in a cellular phone in the form of a pre-paid card. However, in this system, account reconciliation is made by downloading electronic values onto a value card program, which is fundamentally different from the account reconciliating method of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An accounting and reconciliation system comprising:
   a seller terminal for a seller;
   a buyer terminal for a buyer, the buyer terminal sending purchase request data including purchase transaction information which specifies purchase transaction conditions for a product or service;
   an account reconciliation server which guarantees account reconciliation in purchase transactions between the buyer and the seller of the product or service, the reconciliation unit comprising:
   communication circuitry for establishing communications with each of the buyer terminal and the seller terminal;
   credit data creating means for (a) creating, based on the purchase request data received from the buyer terminal, credit data including information which specifies purchase transaction conditions for the product or service, and (b) sending the credit data created to the seller terminal, the credit data guaranteeing payment to the seller by the account reconciliation server for the product or service;
   credit data storing means for storing the credit data;
   data comparing means for comparing the stored credit data with acknowledgment data received from the buyer terminal, the acknowledgment data (a) being issued by the buyer terminal when the buyer receives from the seller the product or service, and (b) indicating a product or service delivered from the seller to the buyer; and
   paying means for making payment for the product or service to the seller terminal when the content of the acknowledgment data satisfies the purchase transaction conditions described in the stored credit data.

2. The accounting and reconciliation system as set forth in claim 1, wherein:
   said seller terminal includes an input device usable by the seller to input an estimate in response to an estimate request from the buyer for a product or service to be supplied,
   said seller terminal creates estimate data based on the estimate, and sends the estimate data to said buyer terminal, and
   said buyer terminal receives the estimate data, and creates the purchase request data based on the received estimate data.

3. The accounting and reconciliation system as set forth in claim 2, wherein:
   said buyer terminal includes a display for displaying content of the received estimate data, and an input device usable by the buyer to accept the content of the displayed estimate data, and
   said buyer terminal creates the purchase request data upon acceptance of the content of the estimate data.

4. The accounting and reconciliation system as set forth in claim 3, wherein:
   the estimate data contains information which specifies first and second payment methods, and
   said buyer terminal prompts the buyer via said display to confirm that the second payment method may be used if the first payment method fails.

5. The accounting and reconciliation system as set forth in claim 1, wherein:
   said buyer terminal includes an input device usable by the buyer to input information which relates to one or more of an effective period of the purchase request data, delivery date of the product or service, delivery method of the product or service, possibility of separate delivery, and due date of payment from a bank, and
   said buyer terminal incorporates the input information in the purchase request data.

6. The accounting and reconciliation system as set forth in claim 1, wherein:

the purchase transaction conditions comprise information which relates to delivery date of the product or service, delivery method, and possibility of separate delivery.

7. The accounting and reconciliation system as set forth in claim 1, wherein:

the purchase transaction conditions comprise information of a purchase price of the product or service.

8. The accounting and reconciliation system as set forth in claim 1, wherein:

said seller terminal includes a processing system, and an input device usable by the seller to confirm content of the credit data received from said reconciliation unit, and the processing system of said seller terminal destroys the credit data, terminates supply of the product or service, and changes the purchase transaction conditions when there is no confirmation by the seller with regard to the content of the credit data.

9. The accounting and reconciliation system as set forth in claim 1, wherein:

said seller terminal includes a processing system that creates delivery list data based on content of the credit data, and communication circuitry that sends the delivery list data to said buyer terminal.

10. The accounting and reconciliation system as set forth in claim 9, wherein the acknowledgement data contains information which relates to whether the product or service listed in the delivery list data has been supplied to the buyer.

11. The accounting and reconciliation system as set forth in claim 1, wherein:

said seller terminal includes communication circuitry that sends receipt data to said reconciliation unit when the payment data is received, and the processing system of said reconciliation unit bills the buyer for the product or service after receiving the receipt data.

12. The accounting and reconciliation system as set forth in claim 1, wherein:

the processing system of said reconciliation unit uses the same credit data if the buyer and the seller remain unchanged and if the same purchase transaction is repeated.

13. The accounting and reconciliation system as set forth in claim 1, wherein said buyer terminal comprises a cellular phone.

14. An accounting and reconciliation method which guarantees account reconciliation in purchase transactions between a buyer and a seller of a product or service, the method comprising:

(1) creating in an account reconciliation server, based on purchase request data sent from a buyer terminal for the buyer, credit data including information which specifies purchase transaction conditions for the product or service and sending the electronic credit data to a seller terminal for the seller, the credit data guaranteeing payment to the seller by the account reconciliation server for the product or service;

(2) storing the credit data;

(3) comparing the stored credit data with acknowledgment data received from the buyer terminal, the acknowledgment data being issued by the buyer terminal when the buyer receives from the seller the product or service, and the acknowledgment data indicating a product or service delivered from the seller to the buyer; and (4) making payment for the product or service to the seller terminal when the content of the acknowledgment data satisfies the purchase transaction conditions described in the stored credit data.

15. An account reconciliation server which guarantees account reconciliation in purchase transactions between a buyer and a seller of a product or service, the account reconciliation server comprising:

a communicating circuit for establishing communications with each of a buyer terminal of the buyer and a seller terminal of the seller;

credit data creating means for (a) creating based on purchase request data received from the buyer terminal, credit data including information which specifies purchase transaction conditions for the product or service, and (b) sending the credit data created to the seller terminal, the credit data guaranteeing payment to the seller by the account reconciliation server for the product or service;

credit data storing means for storing the credit data;

data comparing means for comparing the stored credit data with acknowledgment data received from the buyer terminal, the acknowledgment data (a) being issued by the buyer terminal when the buyer receives from the seller the product or service, and (b) indicating a product or service delivered from the seller to the buyer; and paying means for making payment for the product or service to the seller terminal when the content of the acknowledgment data satisfies the purchase transaction conditions described in the stored credit data.

* * * * *